United States Patent [19]

Hess

[11] Patent Number: 5,031,463
[45] Date of Patent: Jul. 16, 1991

[54] LOAD CELL OUTPUT CORRECTION CIRCUITRY

[75] Inventor: William C. Hess, Anaheim, Calif.
[73] Assignee: Sensortronics, Inc., Covina, Calif.
[21] Appl. No.: 496,244
[22] Filed: Mar. 20, 1990
[51] Int. Cl.$^5$ .............................................. G01B 7/16
[52] U.S. Cl. .................................... 73/766; 73/862.63
[58] Field of Search ................... 73/765, 766, 862.63, 73/769; 364/573

[56] References Cited

U.S. PATENT DOCUMENTS

| | | | |
|---|---|---|---|
| 3,667,041 | 5/1972 | Senour | 73/769 X |
| 4,012,953 | 3/1977 | Ormond | 73/765 X |
| 4,355,537 | 10/1982 | vander Have | 73/862.63 X |
| 4,419,620 | 12/1983 | Kurtz et al. | 73/862.63 X |

Primary Examiner—Jerry W. Myracle
Attorney, Agent, or Firm—Price, Gess & Ubell

[57] ABSTRACT

Correction circuitry connectable in parallel with a conventional load cell output for compensating for various errors resulting from nonlinearity, creep, and temperature effects. Such circuitry includes an operational amplifier circuit employing the nonlinear characteristic of a diode to create a nonlinear correction signal and an operational amplifier circuit employing a long time constant RC circuit to correct creep.

18 Claims, 5 Drawing Sheets

LOAD CELL OUTPUT CORRECTION CIRCUITRY

BACKGROUND OF THE INVENTION

1. Field of the Invention

The subject invention relates generally to load cells and, more particularly, to electronic circuitry for improving the electrical output of such load cells.

2. Description of Related Art

In the prior art, load cell circuitry is known wherein strain gauges are employed in a Wheatstone bridge circuit. The bridge is subject to excitation voltage and produces an output signal. While providing useful measurements in various applications, such as shear beam (single and dual bridge) load cells, column load cells, cantilever beam load cells, and platform load cells, such load cells are nevertheless subject to various inaccuracies in their output signals.

Inaccuracies in load cell outputs may arise from nonlinearity, creep, hysteresis, and modulus compensation error. "Nonlinearity" refers to the departure in the signal output voltage from a straight line from zero load through a range of measured force. Typically, a calibration curve is developed, which is a record of the comparison of load cell output against a range of standard test loads from a no load state up to the so-called "rated load," which is the maximum load (force) the load cell is designed to measure within its specifications. "Nonlinearity" then refers to the deviation of the calibration curve from a straight line drawn between the no load and rated load output.

"Modulus compensation error" refers to a variation of the load cell signal output with temperature. Such errors may be either positive or negative going.

Load cell "creep" arises because the steel or other metal to which strain gauges are attached in a load cell stretches over time when a force is applied to the load cell. Creep results in an increasing or decreasing, rather than level, output signal from the load cell, when all other variables, including the weight being measured, are constant. Strain gauges used in load cells typically have a built-in negative creep to compensate for the positive creep of the load cell metal. The amount of creep typically varies from load cell to load cell due to manufacturing variances. Hence, the built-in creep compensation is not entirely effective.

SUMMARY OF THE INVENTION

Accordingly, it is an object of the invention to improve load cells;

It is another object of the invention to improve the accuracy of output signals of such load cells;

It is another object of the invention to correct the output of strain gauge load cells to compensate for various errors therein; and It is another object of the invention to provide correction circuitry which is easily adaptable for use with presently known load cell circuitry designs.

The invention provides correction circuitry which may be connected in parallel with existing load cell circuitry and which cooperates with such circuitry to reduce the effects of creep, nonlinearities, and other effects. One embodiment of the circuitry employs the nonlinear characteristic of a diode in conjunction with an operational amplifier to correct for nonlinearity. A second embodiment employs an RC feedback circuit in conjunction with an operational amplifier to correct for creep. Such circuits may be used in combination to correct for both creep and nonlinearity. Temperature compensation may also be incorporated into the circuitry, as hereafter disclosed.

BRIEF DESCRIPTION OF THE DRAWINGS

The just-summarized invention will now be described in detail in conjunction with the drawings, of which.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide particularly commercially suitable and readily manufacturable load cell correction circuitry.

Figure 1:
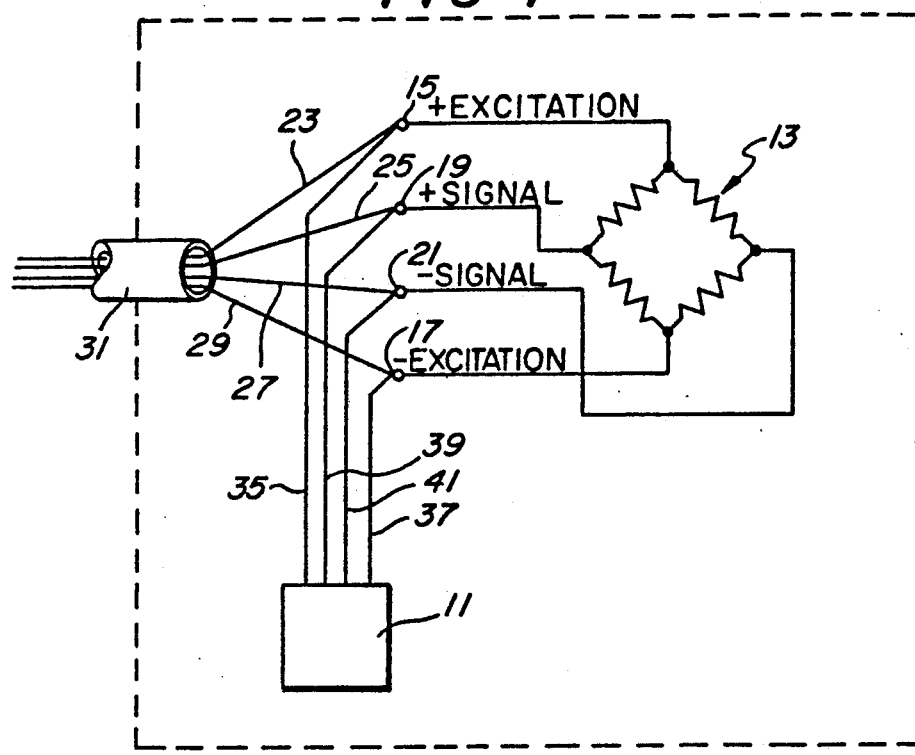
FIG. 1 is a wiring diagram illustrating a typical load cell used in conjunction with a correction circuit according to the preferred embodiment.

FIG. 1 illustrates a strain gauge Wheatstone bridge circuit 13 as known in the prior art. The bridge circuit 13 is subject to a positive DC excitation voltage applied to a terminal 15 and a negative DC excitation voltage applied to a terminal 17. The bridge circuit outputs a positive DC signal and a negative DC signal on respective terminals 19, 21. The terminals are connected to respective leads 23, 25, 27, 29 comprising a load cell cable 31.

According to the preferred embodiment, a correction circuit 11 is connected in parallel with the load cell circuit by respective leads 35, 39, 41, 37. As hereafter described, the correction circuit 11 applies a signal to correct or compensate for various inaccuracies of the output signal of the load cell bridge circuit 13. The circuit 11 may comprise various circuit types for correcting various respective characteristics or may comprise a combination of individual circuits, each connected in parallel with the load cell circuit, for correcting a number of observed inaccuracies, as hereafter described. The selection of a circuit or circuits to connect in parallel with the load cell circuit is based on measurement of the output signal characteristics of an individual load cell during manufacture.

Figure 2:
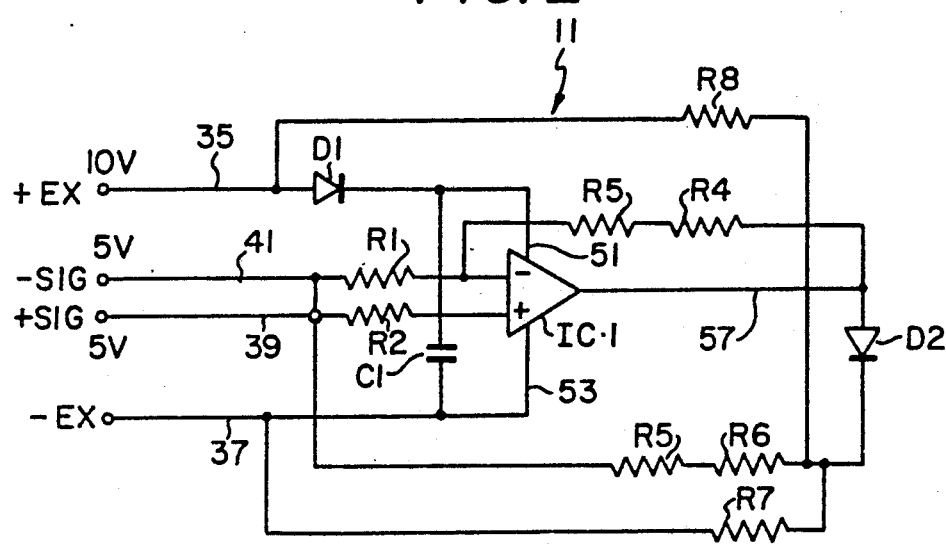
FIG. 2 is a circuit schematic of a linearity correction circuit according to the preferred embodiment.

FIG. 2 illustrates one embodiment of circuit 11, a load cell linearizing amplifier circuit. The circuit 11 includes an operational amplifier IC-1 operating as a differential amplifier. The positive and negative inputs of the amplifier IC-1 are connected to respective input resistors $R_2$, $R_1$. Respective bias terminals 51, 53 of the amplifier IC-1 are connected to the respective excitation voltages on respective lines 35, 37. A diode $D_1$ is located in line 35 leading to terminal 51 to protect the circuitry against connection of an excitation voltage signal of reverse polarity. A bypass capacitor $C_1$ is connected between the negative excitation line 37 and the cathode of the diode $D_1$ to prevent instability of the operational amplifier (IC-1).

The excitation voltages on lines 35 and 37 may be, for example, on the order of 10 volts and 0 volts D.C., respectively. In such an example, the positive (plus) and negative (minus) signal leads 39, 47 are typically close to center tapping the excitation voltage, so that they are typically close to 5 volts. With no load on the load cell, the circuit 11 does not alter the output signal of the load cell.

Further, according to FIG. 2, third and fourth resistors $R_3$, $R_4$ are connected in series in the feedback path between the output 57 of the amplifier IC-2 and its negative input. A second diode $D_2$ and fifth and sixth resistors $R_5$, $R_6$ are serially connected between the output 57 and input line 41, while a seventh resistor $R_7$ is connected between the cathode of the second diode $D_2$ and the negative excitation input 37.

Figure 3:
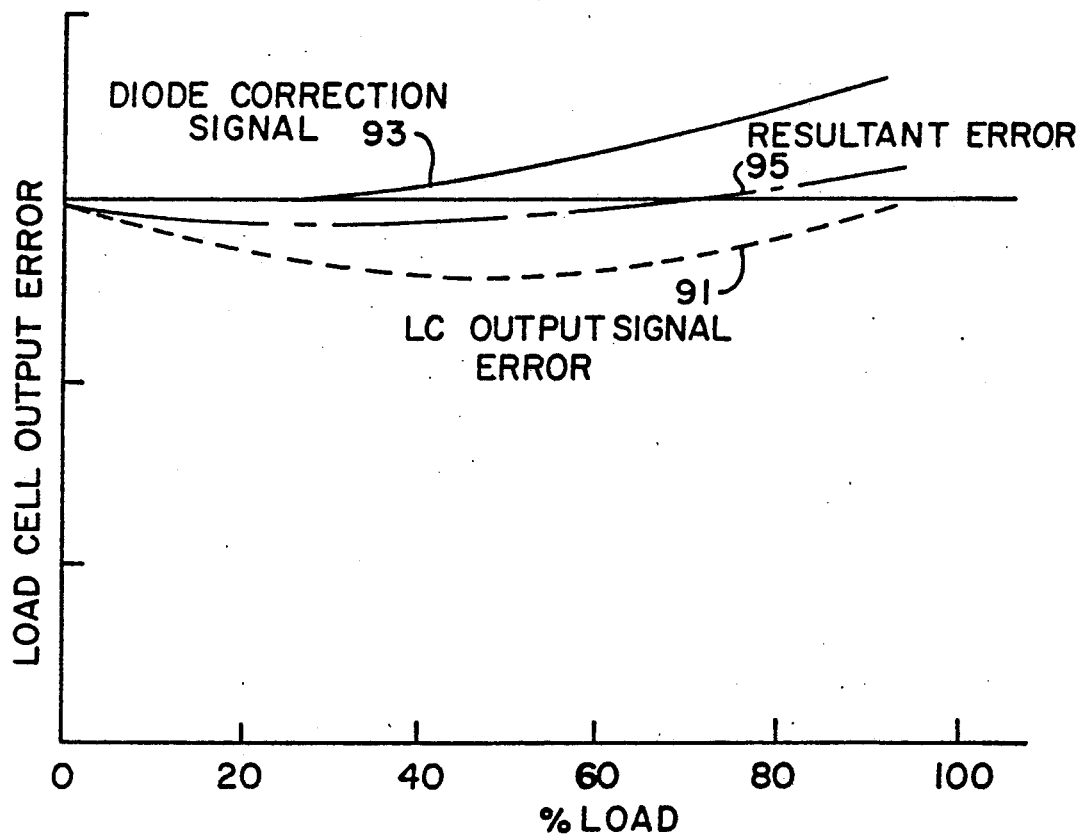
FIG. 3 is a graph of the load cell linearity error versus the load cell load, illustrative of the operation of the circuit of FIG. 2.

In basic operation of the circuit of FIG. 2, the nonlinear portion of the voltage/current characteristic (transfer function) of the diode $D_2$, e.g., from approximately 0.2 to 0.6 volts, is employed to compensate for the nonlinear portion of the linearity curve of the load cell 13, as illustrated in FIG. 3. FIG. 3 particularly shows the output load cell error 91 in microvolts, the nonlinear correction signal 93 added according to the preferred embodiment, and the resultant reduced linearity error 95.

The resistances $R_3$, $R_4$, $R_5$, $R_6$, $R_7$, and $R_8$ shown in FIG. 2 are selected to position the nonlinear portion of the characteristic of the diode $D_2$ in the proper place with respect to the load cell output signal voltage error to achieve compensation. Resistances $R_3$ and $R_4$ set the voltage gain of the op amp IC-1 and select where correction starts. Resistances $R_5$ and $R_6$ adjust the amount of feedback for the linearity correction. Input resistances $R_1$, $R_2$ and $R_3$, $R_4$ are further selected such that, with no load on the load cell 13, the circuit 11 has no effect on the load cell output. Resistors $R_5$ and $R_6$ are feedback resistances and control the amount of correction.

Resistors $R_7$ and $R_8$ adjust the diode current. Without them, there is insufficient current through the diode $D_2$. If the current is too small, the diode $D_2$ simply acts like a resistor.

Exemplary values for the passive components of FIG. 2 are set forth in the following table:

| | | | |
|---|---|---|---|
| $R_1$ | 100 kΩ | $R_5$ | $3.3 \times 10^6 Ω$ |
| $R_2$ | 100 kΩ | $R_6$ | $2.2 \times 10^6 Ω$ |
| $R_3$ | $1.5 \times 10^6 Ω$ | $R_7$ | 200 kΩ |
| $R_4$ | $1.5 \times 10^6 Ω$ | $R_8$ | 200 kΩ |
| | | $C_1$ | .2 μf |

It may be noted that the resistor pairs $R_3$, $R_4$ and $R_5$, $R_6$ could be single resistors, but are chosen to be discrete resistors because of availability of the particular component values involved. Various combinations of resistors may be chosen to correct for various kinds and degrees of nonlinearities. It should also be noted that, by connecting the resistor pair $R_5$–$R_6$ to lead 39 instead of lead 41, a correction circuit 11 for correcting a positive going linearity error is constructed.

Figure 4:
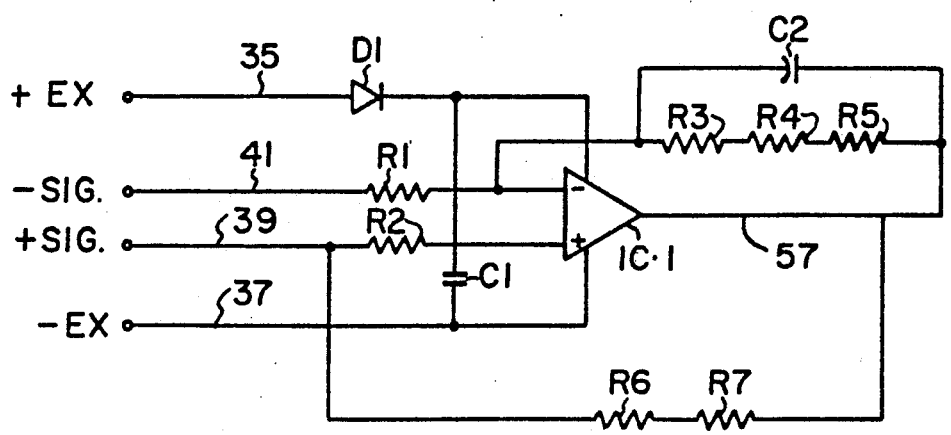
FIG. 4 is a circuit schematic of a creep correction circuit according to the preferred embodiment.

A second correction circuit 11 is shown in FIG. 4. This circuit 11 is designed to compensate for creep. the circuit again employs an op amp IC-1 in a differential configuration with first and second resistances $R_1$, $R_2$ connected to its respective negative and positive inputs from the load cell signal on leads 41, 39. Power is supplied by the load cell excitation lines 35, 37 and protection by a diode $D_1$. A feedback loop between the amplifier output 57 and its negative input includes a high resistance in parallel with a capacitor $C_2$. The resistance is shown as three discrete resistors $R_3$, $R_4$, $R_5$. A pair of resistors $R_6$, $R_7$ is also connected in series between the output 57 and positive input line 39. Component values in a typical application are as follows:

| | | | |
|---|---|---|---|
| $R_1$ | 249 kΩ | $R_5$ | $2.2 \times 10^6 Ω$ |
| $R_2$ | 249 kΩ | $R_6$ | $4.7 \times 10^6 Ω$ |
| $R_3$ | $2.2 \times 10^6 Ω$ | $R_7$ | $20 \times 10^6 Ω$ |
| $R_4$ | $2.2 \times 10^6 Ω$ | $C_2$ | 47 μf, 10 volts |

It will be observed that the feedback loop including capacitor $C_2$ provides a very long time constant, 5.2 minutes for the component values illustrated. This time dependent feedback effectively cancels the load cell creep, approximately 90% of which occurs in the first 15 minutes of an applied load.

Figure 5:
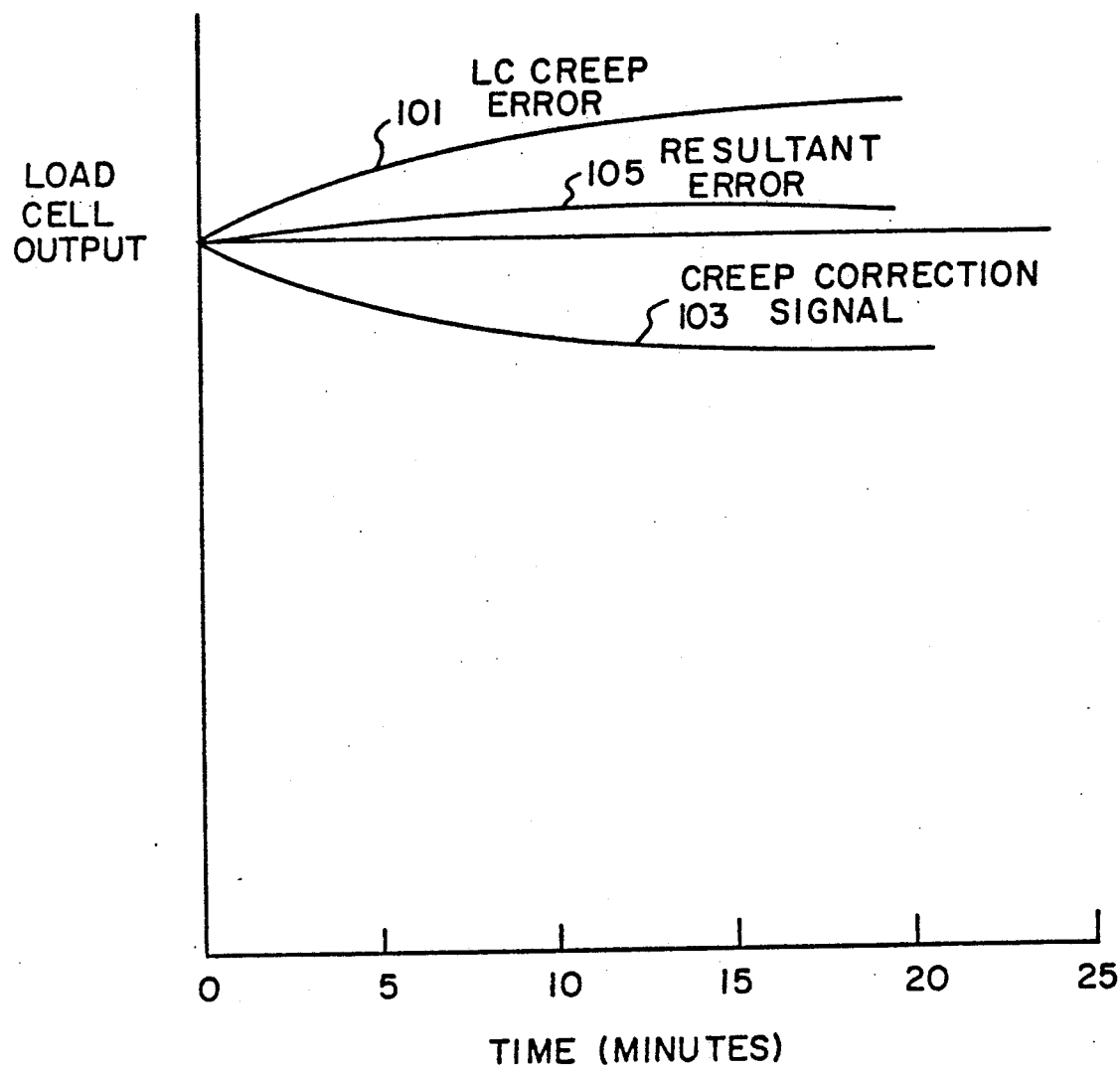
FIG. 5 is a graph showing load cell creep error versus time and correction thereof, illustrative of the operation of the circuit of FIG. 4.

FIG. 5 illustrates a positive load cell creep error 101, being cancelled by a creep correction signal 103 generated by a circuit 11 of the preferred embodiment. The resultant error 105 is considerably smaller and more tolerable than the error without correction.

In application, a load cell such as load cell 13 is tested. If the load cell 13 exhibits a positive creep characteristic, the circuit of FIG. 4 is used. If there is a negative creep characteristic, a circuit like that of FIG. 4 is used, but leads 39 and 41 are reversed. Application of the circuit in this manner causes the creep error to be corrected to a more nearly straight line path, i.e., the load cell output is not time dependent.

Figure 6:
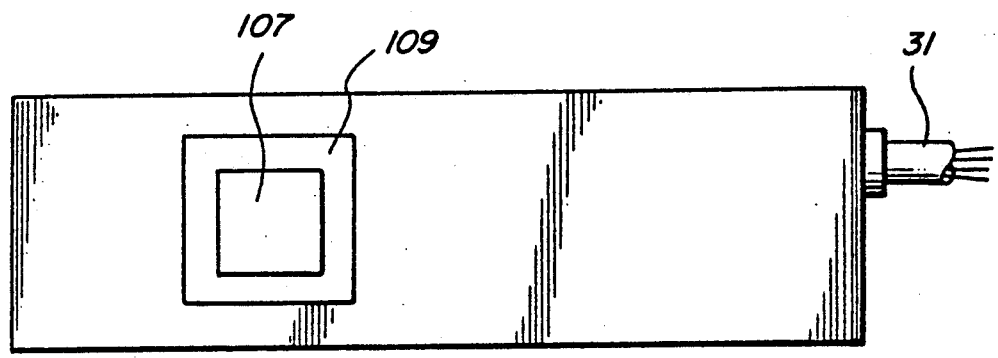
FIG. 6 is a side schematic view of a load cell containing a correction circuit according to the preferred embodiment.
Figure 7:
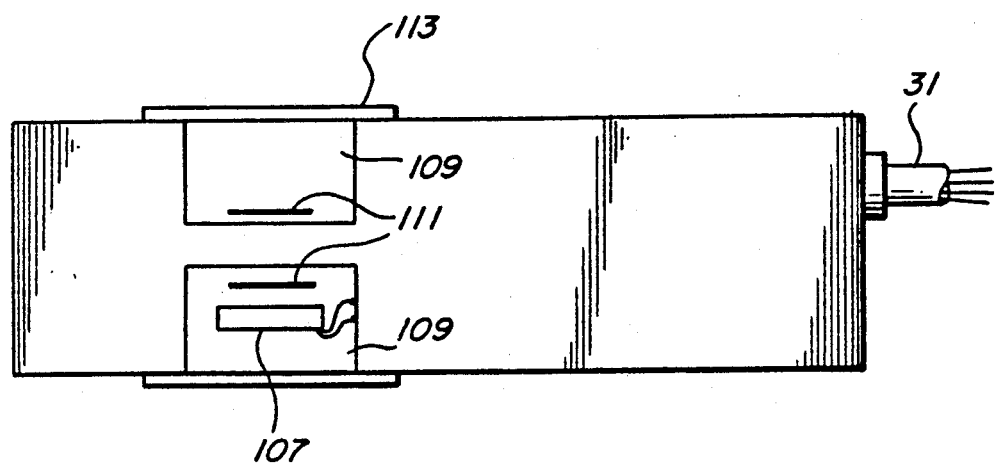
FIG. 7 is a top schematic view of the load cell of FIG. 6.

Typical load cell devices mount strain gauges in pockets in steel load elements. Circuits such as those shown in FIGS. 2 and 4 can be conveniently fabricated on small circuit cards approximately ⅝-inch by ⅝-inch by ¼-inch high. As shown in FIGS. 6 and 7, one such small card 107 can be conveniently located in a load cell pocket 109 with the strain gauge element 111. A cover 113 typically is placed over the pockets 109. Such an arrangement is highly convenient and is illustrated in FIGS. 6 and 7.

Another advantage of the preferred embodiment is that, because of the parallel connection of the correction circuit 11 to the conventional load cell apparatus, if a circuit 11 fails, the load cell 13 still operates, although at reduced accuracy. The typical errors being corrected are relatively small, of a magnitude on the order ±0.005% to ±0.04%.

Load cells also exhibit temperature effects on characteristics such as linearity and creep. By adding an appropriate thermistor to the circuit of FIGS. 2 and 4, the circuits will produce correction factors that are dependent on the temperature.

Figure 8:
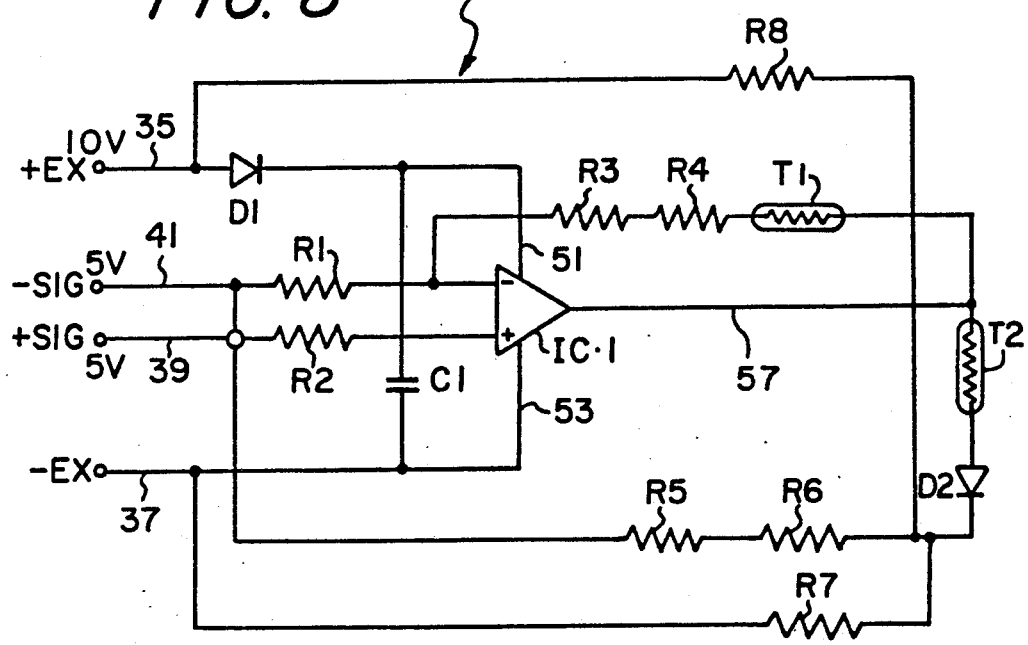
FIGS. 8 and 9 are circuit schematics illustrating alternate embodiments with temperature compensation.
Figure 9:
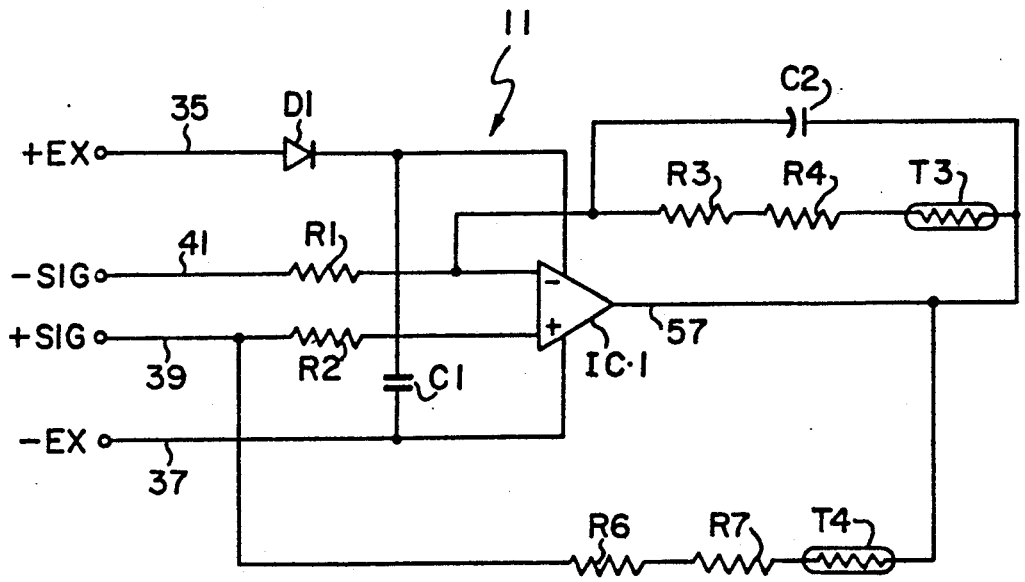

FIG. 8 illustrates the circuit of FIG. 2 with the addition of thermistors $T_1$ and $T_2$, while FIG. 9 shows the circuit of FIG. 4 with the addition of thermistors $T_3$ and $T_4$. By selecting the thermistor location, a plus or minus temperature coefficient of correction can be produced. Thus, thermistors $T_1$ and $T_3$ provide a positive temperature coefficient of correction which compensates for error due to increasing ambient temperature, while thermistors $T_2$ and $T_4$ provide negative temperature coefficients of correction which compensate for error due to decreasing ambient temperature. It will be appreciated that either one or both of the thermistors $T_1$ and $T_2$ may be used in an embodiment according to FIG. 8. Likewise, either one or both of the thermistors $T_3$ and $T_4$ may be used in an embodiment according to FIG. 9.

Those skilled in the art will appreciate that various adaptations and modifications of the just-described preferred embodiment can be made without departing from the scope and spirit of the invention. Therefore, it is to be understood that, within the scope of the appended claims, the invention may be practiced other than as specifically described herein.

What is claimed is:

1. The apparatus comprising:
   a load cell having first and second excitation terminals and first and second signal terminals, said signal terminals providing the output of said load cell; and
   means connected to said first and second signal terminals and said first and second excitation terminals in parallel with said load cell for compensating for inaccuracy in the output of said load cell, said means for compensating for inaccuracy further comprising:
   an amplifier means having an output and first and second inputs, said first and second inputs being connected, respectively, to said first and second signal terminals;
   means connected to the output of said amplifier means for generating a nonlinear voltage versus current characteristic; and
   means connected to said amplifier means and said generating means for employing said nonlinear voltage versus current characteristics to generate a nonlinear correction voltage of a magnitude selected to compensate for linearity error in the output of said load cell.

2. The apparatus of claim 1 wherein said means for compensating for inaccuracy further includes means for correcting for creep int he output of said load cell.

3. The apparatus of claim 2 wherein said means for correcting for creep includes means for generating a correction signal having a selected time constant.

4. The apparatus of claim 3 where said means for generating a selected time constant comprises an operational amplifier having an RC circuit in a feedback path thereof.

5. The apparatus of claim 1 wherein said means for generating a nonlinear voltage versus current characteristic comprises a diode.

6. The apparatus of claim 1 wherein said generating means has an output and wherein said means connected to said amplifier means and said generating means comprises:
   first resistor means connected between said output and one of said first and second inputs; and
   second resistor means connected between one of said first and second signal terminals and the output of said generation means.

7. The apparatus of claim 6 wherein said generating means comprises a diode having an anode connected to the output of said amplifier and a cathode connected to said second resistor means.

8. The apparatus of claim 10 wherein said means connected to said amplifier means and said generating means further includes third resistor means for adjusting the current of said diode.

9. The apparatus of claim 8 wherein said means for compensating has no effect on the output of said load cell when there is no load applied to said load cell.

10. The apparatus of claim 9 wherein said means for compensating further includes means for compensating for load cell error due to temperature variation.

11. Apparatus for compensating for inaccuracy int he output of a load cell having first and second signal terminals, said apparatus comprising:
    an amplifier means having an output and first and second inputs for connection, respectively, to said first and second signal terminals;
    means connected to the output of said amplifier means for generating a nonlinear voltage versus current characteristic; and
    means connected to said amplifier means and to said generating means for employing said nonlinear voltage versus current characteristic to generate a signal for compensating for linearity error in the output of said load cell.

12. Apparatus for compensating for inaccuracy in the output of a load cell having first and second signal terminals, said apparatus comprising:
    an amplifier means having an output, a feedback path, and first and second inputs for connection, respectively, to said first and second signal terminals; and
    means for providing time dependent feedback in said feedback path for compensating for creep in the output of said load cell.

13. A method of correcting for inaccuracy in load cell output comprising the steps of:
    measuring the output of a load cell;
    determining the source of inaccuracy therein;
    selecting a correction circuit designed to correct for said inaccuracy; and
    connecting said correction circuit in parallel with said load cell.

14. The method of claim 13 wherein said load cell has a pair of parallel output terminals and wherein, when the source of inaccuracy is due to a plurality of effects, a plurality of said correction circuits, each designed to correct for a particular effect, are connected in parallel with the output terminals of said load cell.

15. Apparatus for compensating for inaccuracy in the output of a load cell having first and second signal terminals, said apparatus comprising:
    an amplifier means having an output, a feedback path, and first and second input for connection, respectively, to said first and second signal terminals; and
    means for providing time dependent feedback in said feedback path for compensating for creep in the output of said load cell.

16. The apparatus of claim 15 wherein said means for providing time dependent feedback comprises a resistance in parallel combination with a capacitance, the parallel combination being connected between the output of said amplifier means and one of said inputs.

17. The apparatus of claim 16 further including a resistance connected between the output of said amplifier and one of said terminals.

18. The apparatus of claim 17 wherein said means for compensating further includes means for compensating for load cell error due to temperature variation.

* * * * *